(12) United States Patent
Inukai et al.

(10) Patent No.: US 6,465,589 B2
(45) Date of Patent: Oct. 15, 2002

(54) PAINT COMPOSITION

(75) Inventors: Hiroshi Inukai; Eiichi Okazaki; Kunihiko Mizutani; Akihito Iida, all of Aichi (JP)

(73) Assignee: Toagosei Co., Ltd., Tokyo (JP)

( * ) Notice: Subject to any disclaimer, the term of this patent is extended or adjusted under 35 U.S.C. 154(b) by 5 days.

(21) Appl. No.: 09/726,446

(22) Filed: Dec. 1, 2000

(65) Prior Publication Data

US 2001/0003764 A1 Jun. 14, 2001

(30) Foreign Application Priority Data

| Dec. 3, 1999 | (JP) | 11-344275 |
| Dec. 21, 1999 | (JP) | 11-362078 |
| Dec. 21, 1999 | (JP) | 11-362080 |
| May 24, 2000 | (JP) | 2000-153313 |

(51) Int. Cl.$^7$ .............................................. C08L 37/00
(52) U.S. Cl. ........................ 526/262; 524/548; 524/560; 526/273; 526/279
(58) Field of Search ................................ 526/262, 273, 526/279; 524/548, 560

(56) References Cited

U.S. PATENT DOCUMENTS

| 4,079,041 A | 3/1978 | Baumann et al. |
| 4,107,174 A | 8/1978 | Baumann et al. |
| 4,158,730 A | 6/1979 | Baumann et al. |
| 4,158,731 A | 6/1979 | Baumann et al. |
| 4,163,097 A | 7/1979 | Baumann et al. |
| 4,172,836 A | 10/1979 | Baumann et al. |
| 4,174,326 A | 11/1979 | Baumann et al. |
| 4,193,927 A | 3/1980 | Baumann et al. |
| 4,626,497 A | 12/1986 | Roth et al. |
| 4,686,166 A | 8/1987 | Kumagai et al. |
| 5,006,621 A | 4/1991 | Wahle et al. |

FOREIGN PATENT DOCUMENTS

| EP | 1 043 313 A1 | 10/2000 |
| JP | 52-988 | 1/1977 |
| JP | 52-3055 | 1/1977 |
| JP | 55-160010 | 12/1980 |
| JP | 63-218970 | 9/1988 |
| JP | 1-284514 | 11/1989 |
| JP | 3-6209 | 1/1991 |
| WO | WO98/58912 | 12/1998 |

*Primary Examiner*—Edward J. Cain
(74) *Attorney, Agent, or Firm*—Fitch, Even, Tabin & Flannery

(57) ABSTRACT

A paint composition is provided, which comprises a copolymer comprising the following constitutional units (A), (B), and (C) as essential components: (A) a (meth)acrylate monomer unit having a straight-chain, branched-chain, or cyclic alkyl group; (B) at least one monomer unit selected from the group consisting of a monomer unit having an unsaturated double bond and a hydroxyalkyl group, a monomer unit having an unsaturated double bond and an epoxy group, and a monomer unit having an unsaturated double bond and an alkoxysilyl group; and (C) a monomer unit having an unsaturated double bond and a maleimide group. The paint composition is excellent in weatherability and coating gloss. The composition may be contained in an organic solvent such as cyclic ethers, aromatic hydrocarbons, esters, and ketones. The organic solvent may be one that comprises 40% or more of a saturated hydrocarbon. In this case, it is preferred that a (meth)acrylic ester monomer having an alkyl group of 8 to 20 carbon atoms accounts for 5 to 50% by weight of the total amount of the constitutional units of the copolymer.

12 Claims, No Drawings

PAINT COMPOSITION

The present invention relates to a paint composition excellent in weatherability and coating gloss.

Recently, from the standpoint of elimination of the need of maintenance, there has been an increasing demand for highly durable materials, and it has been required that paint resins also possess higher weatherability. As of now, fluororesins comprised of a fluoroolefin-vinyl ether-series copolymer, acrylic silicon resins, and others have been known as paint resins with excellent weatherability. However, the fluororesins have problems that they are insufficient in recoatability and coating gloss, and when used as thermosetting paints smoothness of the resulting coatings is unsatisfactory, and the resulting coatings turn yellow. Moreover, acrylic silicone resins require humidity at their curing and therefore there arise the problems that airing in winter may result in inadequate curing and that they are not cured only by application of heat. In addition, acrylic silicone resins are still insufficient in weatherability and their coating gloss and adhesion to substrates are also below satisfactory levels. For solving such problems, epoxy group-containing (meth)acrylic copolymers, which are heat-set using a dibasic acid or an acid group-containing resin as a curing agent, have been in wide use as powder paints or acid rain-resistant paints, yet these paints are also unsatisfactory in weatherability.

It is an object of the present invention to provide a paint composition which is curable at ordinary temperature or under application of heat, unsusceptible to external environment upon curing, excellent in coating gloss, and capable of providing a coating with high weatherability, and which is further excellent in adhesion and does not turn yellow.

The inventors of the present invention have made intensive studies to solve the aforementioned problems and finally found that the problem is solved by a paint composition containing a copolymer which comprises, as constitutional units, (A) an acrylic or methacrylic ester monomer unit having a straight-chain, branched-chain, or cyclic alkyl group;

(B) at least one monomer unit selected from the group consisting of a monomer unit having an unsaturated double bond and a hydroxyalkyl group, a monomer unit having an unsaturated double bond and an epoxy group, and a monomer unit having an unsaturated double bond and an alkoxysilyl group; and (C) a monomer unit having an unsaturated double bond and a maleimide group.

That is, the present invention is a paint composition composed of a (meth)acrylic copolymer containing the aforementioned constitutional units (A), (B), and (C) as essential components. In this specification, "(meth)acrylic" means "acrylic or methacrylic", and "(meth)acrylate" means "acrylate or methacrylate".

Hereinafter, the present invention will be described in further detail.

The (meth)acrylic ester monomer as the constitutional unit (A) in the present invention has a straight-chain, branched-chain, or cyclic alkyl group, and the alkyl group may contain a phenyl group, an oxygen atom, a nitrogen atom, a sulfur atom, a halogen atom, and others.

Examples of the (meth)acrylic ester having a straight-chain alkyl group include methyl (meth)acrylate, ethyl (meth)acrylate, propyl (meth)acrylate, butyl (meth)acrylate, pentyl (meth)acrylate, hexyl (meth)acrylate, octyl (meth)acrylate, nonyl (meth)acrylate, decyl (meth)acrylate, lauryl (meth)acrylate, tridecyl (meth)acrylate, cetyl (meth)acrylate, stearyl (meth)acrylate, and behenyl (meth)acrylate. The monomer may be one having an aromatic ring, an oxygen atom, a nitrogen atom, a sulfur atom, a halogen atom, or others in its alkyl group, examples of which include benzyl (meth)acrylate, phenoxyethyl (meth)acrylate, methoxyethyl (meth)acrylate, ethylcarbitol (meth)acrylate, ethoxypolyethylene glycol 400 (meth)acrylate, aminoethyl (meth)acrylate, chloroethyl (meth)acrylate, trifluoroethyl (meth)acrylate, and heptadecafluorooctylethyl (meth)acrylate.

Examples of the (meth)acrylic ester having a branched-chain alkyl group include isopropyl (meth)acrylate, isobutyl (meth)acrylate, s-butyl (meth)acrylate, t-butyl (meth)acrylate, neopentyl (meth)acrylate, ethylhexyl (meth)acrylate, isodecyl (meth)acrylate, and isostearyl (meth)acrylate. The monomer may be one having an aromatic ring, an oxygen atom, a nitrogen atom, a sulfur atom, a halogen atom, or others in its alkyl group, examples of which include 3-methoxybutyl (meth)acrylate, methoxytripropylene glycol (meth)acrylate, and hexafluoropropyl (meth)acrylate.

Examples of the (meth)acrylic ester having a cyclic alkyl group include cyclohexyl (meth)acrylate, isobornyl (meth)acrylate, and tricyclodecynyl (meth)acrylate. The monomer may be one having an aromatic ring, an oxygen atom, a nitrogen atom, a sulfur atom, a halogen atom, or others in its alkyl group, examples of which include tetrahydrofurfuryl (meth)acrylate and morpholinoethyl (meth)acrylate.

These (meth)acrylic esters can be used singly or in combination.

Among the (meth)acrylic esters exemplified above, from the viewpoint of hardness of coatings and weatherability, those having an alkyl group of 1 to 20 carbon atoms are preferred, and those having an alkyl group of 1 to 8 carbon atoms are particularly preferred. Examples of such monomers include methyl (meth)acrylate, ethyl (meth)acrylate, butyl (meth)acrylate, isobutyl (meth)acrylate, t-butyl (meth)acrylate, ethylhexyl (meth)acrylate, and cyclohexyl (meth)acrylate.

When hardness of coatings is of particular importance, monomers having an alkyl group of 1 to 7 carbon atoms are preferred. Examples of such monomers include methyl (meth)acrylate, ethyl (meth)acrylate, butyl (meth)acrylate, isobutyl (meth)acrylate, t-butyl (meth)acrylate, and cyclohexyl (meth)acrylate.

If prevention of lifting phenomenon described later is of particular importance, it is preferred that a monomer having an alkyl group of 8 to 20 carbon atoms is used. Examples of such monomer include octyl (meth)acrylate, 2-ethylhexyl (meth)acrylate, nonyl (meth)acrylate, decyl (meth)acrylate, lauryl (meth)acrylate, tridecyl (meth)acrylate, cetyl (meth)acrylate, palmitoyl (meth)acrylate, stearyl (meth)acrylate, behenyl (meth)acrylate, octadecanoyl (meth)acrylate, oleyl (meth)acrylate, icosanoyl (meth)acrylate, and isobornyl (meth)acrylate.

The constitutional unit (B) in the present invention can be selected from the group consisting of a monomer unit having an unsaturated double bond and a hydroxyalkyl group, a monomer unit having an unsaturated double bond and an epoxy group, and a monomer unit having an unsaturated double bond and an alkoxysilyl group.

Examples of the monomer having an unsaturated double bond and a hydroxyalkyl group are hydroxyalkyl group-containing ethylenically unsaturated monomers including hydroxyl group-containing monomers such as hydroxybutyl vinyl ether, hydroxyethyl allyl ether, and hydroxyethyl crotonate besides (meth)acrylic esters such as hydroxyethyl (meth)acrylate, 2-hydroxypropyl (meth)acrylate, hydroxybutyl (meth)acrylate, 2-hydroxychloropropyl (meth)acrylate and commercial products available under the tradename "Placcel F" product family (i.e., lactone-modified hydroxyethyl-modified (meth)acrylic ester) manufactured by Daicel Chemical Industries, Ltd. Of these, monomers having a primary hydroxyl group are preferred because they easily react with curing agents such as isocyanates and melamine. Examples of such monomers include hydroxyethyl (meth)acrylate, hydroxybutyl (meth)acrylate, and the aforementioned commercial products "Placcel F".

Examples of the monomer having an unsaturated double bond and an epoxy group are epoxy group-containing ethylenically unsaturated monomers including glycidyl (meth)acrylate, single terminal (meth)acrylic acid adducts of bisphenol A diglycidyl ether, allyl glycidyl ether, and glycidyl vinyl ether. Of these, glycidyl (meth)acrylate is preferred due to its copolymerizability with other monomers. This monomer unit is particularly useful in producing a thermosetting paint. The thermosetting paint is a paint which, after a main agent of the paint and a curing agent have been mixed together, is crosslinked and forms a tough coating upon heating, and is usually used in the form of a solvent- or powder-type paint.

The monomer having an unsaturated double bond and an alkoxysilyl group is a compound represented by the following formula (5):

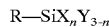

$$R\text{—}SiX_nY_{3-n} \quad (5)$$

wherein R is a group having an olefinic unsaturated double bond; X is an alkyl group having 1 to 20 carbon atoms; Y is a hydrolyzable group; and when there are a plurality of Xs or Ys, the Xs and the Ys may independently be the same or different; and n is 0, 1, or 2.

Specific examples of the group denoted by R in the formula (5) include vinyl, allyl, butenyl, vinyloxy, allyloxy, acryloyl, methacryloyl, $CH_2\text{=}CHO(CH_2)_3\text{—}$, $CH_2\text{=}CHCOO(CH_2)_3\text{—}$, $CH_2\text{=}CHOCO(CH_2)_3\text{—}$, $CH_2\text{=}C(CH_3)COO(CH_2)_3\text{—}$, and $CH_2\text{=}C(CH_3)COO(CH_2)_2\text{—}O\text{—}(CH_2)_3\text{—}$ groups. Among these, $CH_2\text{=}CHCOO(CH_2)_3\text{—}$, $CH_2\text{=}C(CH_3)COO(CH_2)_3\text{—}$, and vinyl groups are preferred.

Specific examples of the group denoted by X include methyl, ethyl, propyl, octyl, and octadecyl groups. Specific examples of the group denoted by Y is an alkoxy group. Concrete examples of the alkoxy group are methoxy, ethoxy, propoxy, butoxy, and methoxyethoxy groups, and methoxy and ethoxy groups particularly preferred.

Examples of the monomer having an unsaturated double bond and an alkoxysilyl group include $CH_2\text{=}C(CH_3)COO(CH_2)_3Si(OCH_3)_3$, $CH_2\text{=}C(CH_3)COO(CH_2)_3Si(OC_2H_5)_3$, $CH_2\text{=}C(CH_3)COO(CH_2)_3SiCH_3(OCH_3)_2$, $CH_2\text{=}CHCOO(CH_2)_3Si(OCH_3)_3$, $CH_2\text{=}CHCOO(CH_2)_3Si(CH_3)_2(OC_2H_5)$, $CH_2\text{=}CHSi(OCH_3)_3$, and $CH_2\text{=}CHSi(OC_2H_5)_3$.

The constitutional unit (C) in the present invention is a monomer having an unsaturated double bond and a maleimide group, and it is preferred that the monomer is an ethylenically unsaturated monomer having a maleimide group represented by the following formula (1):

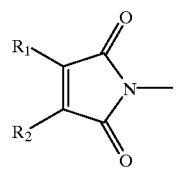

(1)

wherein $R_1$ and $R_2$ are independently a hydrogen atom or an alkyl group having 4 or less carbon atoms; one of $R_1$ and $R_2$ is a hydrogen atom and the other is an alkyl group having 4 or less carbon atoms; or $R_1$ and $R_2$ are a hydrocarbon group of a 5- or 6-membered ring formed by linkage with each other.

Moreover, particularly preferred is a monomer represented by the formula (1) shown above in which both $R_1$ and $R_2$ are alkyl groups having 4 or less carbon atoms, one of $R_1$ and $R_2$ is a hydrogen atom and the other is an alkyl group having 4 or less carbon atoms, or $R_1$ and $R_2$ are a hydrocarbon group of a 5- or 6-membered ring formed by linkage with each other, because such monomer is superior in copolymerizability with other monomers.

From the viewpoint of ease of production, a maleimide (meth)acrylate represented by the following formula (2) is more preferable. Furthermore, a tetrahydrophthalimide (meth)acrylic ester monomer represented by the following formula (3) is preferable because the resulting coatings have a good balance between hardness and processability.

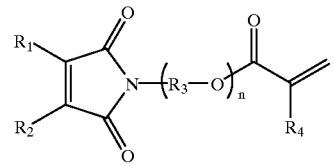

(2)

wherein $R_1$ and $R_2$ are independently a hydrogen atom or an alkyl group having 4 or less carbon atoms; one of $R_1$ and $R_2$ is a hydrogen atom and the other is an alkyl group having 4 or less carbon atoms; or $R_1$ and $R_2$ is a hydrocarbon group of a 5- or 6-membered ring formed by linkage with each other; $R_3$ is an alkylene group which may be branched; $R_4$ is a hydrogen atom or a methyl group; and n is an integer of from 1 to 6.

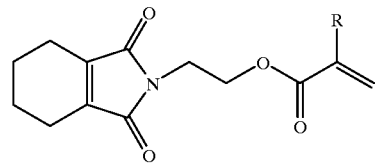

(3)

wherein R is a hydrogen atom or a methyl group.

The copolymer of the present invention may further comprise other copolymerizable monomer units so long as its properties are not adversely affected. Such monomers are classified into those having a functional group other than hydroxyl group, epoxy group and alkoxysilyl group (hereinafter, referred to as "other functional groups") and those having no functional group.

Examples of the monomers having other functional groups include carboxylic acid-containing monomers such as (meth)acrylic acid, itaconic acid, maleic acid, fumaric acid, vinyl acetate, and crotonic acid.

Examples of the monomers having no functional group include α-olefins such as ethylene, propylene, and isobutylene; partially halogenated olefins such as vinyl chloride, vinylidene chloride, vinyl fluoride, and vinylidene fluoride; allyl compounds such as allyl acetate and allyl butyrate; crotonates such as ethyl crotonate and propyl crotonate; vinyl ethers such as ethyl vinyl ether and cyclohexyl vinyl ether; vinyl carboxylates such as vinyl acetate, vinyl propionate, and vinyl versate; styrenes such as styrene, α-methylstyrene, and vinyl toluene; acrylonitrile; acrylamide; and methacrylamide. These monomers can be used either singly or in combination.

It is preferred that the copolymer of the present invention has a copolymerization ratio as follows:

constitutional unit (A): 20 to 95% by weight;
constitutional unit (B): 1 to 50% by weight;
constitutional unit (C): 1 to 40% by weight;
other constitutional units (D): 0 to 40% by weight.

If the proportion of the unit (A) is less than 20% by weight, solvent solubility and film-forming properties of the coating are degraded, and if the proportion exceeds 95% by weight, curability is deteriorated. If the proportion of the unit (B) is less than 1% by weight, curability is degraded, and if the proportion exceeds 50% by weight, processability for coating is deteriorated. If the proportion of the unit (C) is less than 1% by weight, coating gloss and weatherability are not improved, and if the proportion exceeds 40% by weight, stability of the paint is deteriorated. Furthermore, although other constitutional units (D) can be used in such amounts as not to adversely affect the properties of the polymer, a proportion thereof exceeding 40% by weight makes the paint less stable.

Particularly preferred proportion of each constitutional unit is:

constitutional unit (A): 50 to 80% by weight;
constitutional unit (B): 5 to 35% by weight;
constitutional unit (C): 5 to 25% by weight;
other constitutional units (D): 0 to 30% by weight.

It is preferred that a (meth)acrylic ester unit having an alkyl group containing 8 to 20 carbon atoms accounts for 5 to 50% by weight of the total amount of the constitutional monomer units of the copolymer, because lifting of paint coatings formed from the resulting paint composition hardly occurs. The term "lifting" refers to the phenomenon of swelling or peeling of old paint coatings, which occurs when new paints are coated thereon, and such phenomenon causes the resulting coating to be defective. When the amount of the (meth)acrylic ester unit having an alkyl group containing 8 to 20 carbon atoms exceeds 50% by weight, the resulting coating becomes much softer, which is sometimes unfavorable.

The average molecular weight of the copolymer is, in terms of number average molecular weight as determined by gel permeation chromatography using polystyrene as a standard, preferably 1,000 to 1,000,000. In the case where the copolymer is used as a paint polymer which is soluble in an organic solvent, it is particularly preferred that its number average molecular weight is 3,000 to 30,000. When the copolymer is used in the form of an emulsion or suspension in an aqueous medium, it is particularly preferred that its average molecular weight is 10,000 to 500,000. When the polymer is used in a powder paint, it is particularly preferred that its average molecular weight is 3,000 to 50,000.

It is suitable that the glass transition temperature of the copolymer (hereinafter, abbreviated as Tg) is within a range of 5° C. to 100° C., particularly 5 to 80° C. If the Tg is lower than 5° C., stain resistance of the coating degrades, and if the Tg exceeds 80° C., processability for coating is deteriorated. Moreover, if the Tg exceeds 100° C., smoothness of the heat-cured coating is degraded. For use as a powder paint, it is preferred that the copolymer has a Tg of 35° C. or higher. If the Tg is lower than 35° C., when powdered, possibility of blocking arises.

The above-mentioned copolymer can be prepared by radical-polymerizing the above-described monomers from (A) to (D) in the presence of a radical polymerization initiator. As the polymerization method, bulk polymerization, suspension or emulsion polymerization in an aqueous medium, solution polymerization in an organic solvent, and others are adoptable.

As the radical polymerization initiator, peroxides such as diisopropyl peroxydicarbonate, tert-butylperoxypivalate, benzoyl peroxide, and lauroyl peroxide, azo compounds such as azobisisobutyronitrile and azobisisovaleronitrile, and inorganic peroxides such as ammonium persulfate and potassium persulfate are available. It is preferred that the initiator is used in an amount of from 0.0001 to 10% by weight relative to the total amounts of the monomers.

As an emulsifier for use in emulsion polymerization, use of an emulsifier of the anion- or nonion-type, and their concomitant use are preferred. Examples of the emulsifier include higher alcohol sodium sulfates and polyethylene glycol alkylethers, etc. As a reactive emulsifier, "Lumtel" (trade name, manufactured by Kao Corp.), "Eleminol" (trade name, manufactured by Sanyo Chemical Industries Ltd.), "Aquaron" (trade name, manufactured by Dai-ichi Kogyo Seiyaku, Co., Ltd.), or "Adekariasoap" (trade name, manufactured by Asahi Denaka Kogyo, K. K.) may be used. The amount of the emulsifier is preferably within the range of from 0.1 to 50 parts by weight relative to a total of 100 parts by weight of the monomers.

Examples of the organic solvent which is used in solution polymerization include cyclic ethers such as tetrahydrofuran and dioxanes; hydrocarbons such as n-hexane and cyclohexane; aromatic hydrocarbon compounds such as benzene, toluene, and xylene; esters such as ethyl acetate and butyl acetate; ketones such as acetone, methyl ethyl ketone, and cyclohexanone; alcohols such as ethanol, isopropanol, n-butanol, and n-butyl cellosolve; and orthoacid esters such as trimethyl orthoformate and trimethyl orthoacetate. These can be used either alone or in combination. It is preferred that the amount of the organic solvent to be used is within a range of from 20 to 200 parts by weight relative to 100 parts by weight of the total of the monomers. If necessary, a chain transfer agent such as laurylmercaptane may be added.

If the paint composition is one containing an organic solvent, for its efficient production, solution polymerization in which the organic solvent is utilized as a reaction solvent is preferred.

Although no particular restrictions are placed on the polymerization conditions, the polymerization temperature is preferably from 20 to 140° C., and the polymerization is usually effected under ordinary pressure. The polymerization time is preferably from 3 to 40 hours. All the monomers to be polymerized may be batched in the initial stage of the reaction, or portions of the monomers may gradually be added as the polymerization proceeds. If necessary, as a pH adjusting agent, potassium carbonate, sodium hydrogencarbonate, hydrotalcite, an anion-exchanged resin, or others may be added.

The paint composition of the present invention is produced by mixing the above-described copolymer with, if necessary, a variety of additives generally incorporated into paints.

Preferably, the paint composition is one further containing an organic solvent as an essential component, because such composition shows better film-forming properties and coatings formed therefrom tend to present better gloss. Specific examples of the organic solvent include cyclic ethers such as tetrahydrofuran and dioxanes; aromatic hydrocarbons such as benzene, toluene, and xylene; esters such as ethyl acetate and butyl acetate; ketones such as methyl ethyl ketone, methyl isobutyl ketone, and cyclohexanone; saturated hydrocarbons such as n-hexane, cyclohexane, methylcyclohexane, ethylcyclohexane, heptane, octane, nonane, decane, undecane, dodecane, and tridecane; mineral spirits such as "Naphtha" No.5 and No.6 (trade name, manufactured by Exxon Chemical Co.), and "LAWS" and "HAWS" (trade name, manufactured by Shell Chemical Company); high boiling point aromatic compounds such as "Sorbesso 100" and "Sorbesso 150" (trade name, manufactured by Exxon Chemical Co.); and orthoacid esters such as trimethyl orthoformate and trimethyl orthoacetate.

An organic solvent selected from the group consisting of cyclic ethers, aromatic hydrocarbons, esters, and ketones makes the resulting paint composition exceptionally good in storage stability and high in solid matter content, and thus, is favorable.

An organic solvent containing 40% by weight or more of a saturated hydrocarbon makes the resulting paint composition unsusceptible to the lifting phenomenon, and thus, is favorable. An organic solvent containing 50% by weight or more of a saturated hydrocarbon is more preferred.

Moreover, it is preferred that an organic solvent having a boiling point of 60° C. or higher is used. In the case where the constitutional unit (B) is a monomer unit having an epoxy group, use of an organic solvent having a boiling point higher than 80° C. is more preferred. An organic solvent of which the boiling point is lower than 60° C., when the paint composition is made into a paint, may let the paint dry too quickly, resulting in poor film forming properties. It is preferred that the ratio of the copolymer to the organic solvent is from 25:75 to 75:25 (weight ratio).

Further, the copolymer may be used in the form of an aqueous paint by emulsifying with or microsuspending in an aqueous medium, in which case a water-soluble organic solvent such as ethanol, ethylene glycol, butyl cellosolve, "Solfit Acetate" (trade name, manufactured by Kuraray Co., Ltd.), or "Texanol CS12" (trade name, manufactured by Chisso Corp.) may be added thereto and it is preferred that the ratio of the copolymer to the aqueous solvent is 30:70 to 60:40 (weight ratio).

If the constitutional unit (B) of the copolymer of the present invention comprises a monomer unit having a hydroxyalkyl group, the paint composition may further comprise a curing agent which is reactive with hydroxyl group. Such paint composition provides coatings particularly excellent in hardness, solvent resistance, and durability, and therefore, is favorable. As the curing agent reactive with hydroxyl group, there may be mentioned polyisocyanate compounds and aminoplast compounds.

Examples of the polyisocyanate compounds include diisocyanate compounds such as aliphatic diisocyanates typified by tetramethylene diisocyanate, trimethylhexamethylene diisocyanate, and hexamethylene diisocyanate; aromatic diisocyanates typified by tolylene diisocyanate, diphenylmethane diisocyanate, and xylylene diisocyanate; and alicyclic diisocyanates typified by isophorone diisocyanate, 4–4'-methylenebis(cyclohexylisocyanate), and methylcyclohexane-2,4-diisocyanate; dimers and trimers thereof; and adducts and biuret thereof that can be obtained by reacting these diisocyanate compounds with water or polyhydric alcohols; including block isocyanates in which isocyanate groups are protected by other groups.

Specific examples of the aminoplast compounds include melamines such as methylated melamine and butylated melamine; urea resin; and benzoguanamine.

Addition amount of the curing agent reactive with hydroxyl group is, in the case of it being a polyisocyanate compound, in such an amount that the molar ratio of the NCO group of the curing agent to the hydroxyl group of the hydroxyalkyl group-containing copolymer (NCO/OH) is within a range of from 0.2/1.0 to 2.0/1.0, more preferably 0.5/1.0 to 1.5/1.0. If the curing agent employed is an aminoplast compound, it is preferred that the agent is used in such an amount that the weight ratio of the hydroxyalkyl group-containing copolymer to the curing agent (copolymer/curing agent) is within a range of from 3/1 to 10/1. The curing agent may be used together with a curing accelerator such as dibutyl tin dilaurate or p-toluenesulfonic acid.

When the constitutional unit (B) of the copolymer of the present invention comprises a monomer unit having a hydroxyalkyl group, the paint composition can further comprise a hydrolyzed condensate of an alkoxysilane, in which case coatings formed therefrom are excellent in stain resistance and thus preferable. The hydrolyzed condensate of an alkoxysilane is a hydrolyzed condensate of an alkoxysilane having two or more hydrolyzable alkoxy groups within one molecule, and one having a degree of condensation of about 2 to 10 is preferable in that such a condensate shows good compatibility with the copolymer of the present invention and has an excellent ability of improving the stain resistance. As such a compound, those commercially available from Colcoat Co., Ltd. under the trade names, for example, "ES40" (condensate of approximately pentamer of tetraethoxysilane on an average) and "MS51" (condensates of approximately tetramer of tetramethoxysilane on an average) can be used. In addition, those synthesized by the processes recited in Japanese Laid-Open (Kokai) Patent Publication No. Hei 8-176304, Japanese Laid-Open (Kokai) Patent Publication No. Hei 8-113755, and Japanese Laid-Open (Kokai) Patent Publication No. Hei 9-31399 can also be employed. The amount of the hydrolyzed condensate of an alkoxysilane formulated into the paint composition is, in terms of solid matter content of the condensate in a solution, 2 to 100 parts by weight, preferably 5 to 80 parts by weight per 100 parts by weight of the copolymer. If the proportion of the alkoxysilane condensate is less than 2 parts by weight, stain resistance is not improved, but a proportion exceeding 100 parts by weight sometimes makes the coating brittle.

If the constitutional unit (B) of the copolymer of the present invention is one comprising a monomer unit having an epoxy group, it is also possible to use the copolymer in a form of a powder paint by isolating the polymer from monomer residues and volatile matters such as the organic solvent. In the steps of removing residual monomers and the solvent, there can be adopted a technique of re-precipitation in a poor solvent of the copolymer obtained by polymerization in an aqueous medium or an organic solution followed by drying, a technique of thin film hardening by drying with a centrifugal-film evaporator or a conveyor dryer, or a technique of spray-drying. It is preferred that the solid copolymer thus obtained has a volatile matter content of 1% or less. It is also possible to purify bulk-polymerized copolymers by heat-drying under reduced pressure.

When the polymer is used as a powder paint, the polymer is, after having been milled by an impact hammer mill, a vibrating mill, or a Willey grinding mill, mixed with other components, in which case the particle size of the polymer is preferably about 10 to 250 μm.

If the constitutional unit (B) of the copolymer of the present invention is one comprising a monomer unit having an epoxy group, it is preferred that the paint composition is used together with a curing agent reactive with an epoxy group. Examples of such curing agent are acid group-containing compounds and amino group-containing compounds.

Examples of the acid group-containing compounds include low molecular weight polyfunctional carboxylic acids such as succinic acid, phthalic acid, cyclohexanedicarboxylic acid, and dodecanedioic acid; homopolymers of (meth)acrylic acid; copolymers of (meth)acrylic acid with other monomers; polymers obtained by reacting hydroxyl group-containing polymers with acid anhydrides to introduce a carboxylic acid group thereinto; and sulfonic acid group-containing polymers. Examples of the amino group-containing compounds include low molecular weight amino compounds such as tetraethylenediamine, hexamethylenediamine, hexamethylenetetramine, and dicyandiamide; and polymers containing an amino group. Preferred as the curing agent is, from the viewpoint of the water resistance of the resulting coating, a compound containing an acid group. It is preferred that the curing agent is used in such an amount that the ratio of the functional group in the curing agent is 0.1 to 2.0 equivalents per 1 equivalent of the epoxy group. Together with the curing agent described above, a curing accelerator such as dibutyl tin dilaurate and p-toluenesulfonic acid may be added to the paint composition.

If the constitutional unit (B) of the copolymer of the present invention is one comprising a monomer unit having an alkoxysilyl group, the paint composition, after forming a coating, readily starts reaction upon exposure to atmospheric moisture and cures to form a tough hard coating. In this case, for accelerating the curing rate, addition of a curing accelerator is desirable. Examples of the curing accelerator include organic metals such as cobalt naphthenate, lead naphthenate, calcium octylate, lead octylate, zinc octylate, and cobalt octylate; organic titanium compounds such as tetrapropyl titanate and tetrabutyl titanate; and organic tin compounds such as dibutyl tin dilaurate, dioctyl tin dilaurate, dibutyldichlorotin, dibutyl tin diacetoacetate, and triethyl tin monostearate. Addition amount of the curing accelerators is preferably from 1 ppm to 5% by weight, more preferably from 10 ppm to 1% by weight relative to the copolymer.

If necessary, to the paint composition of the present invention may added a pigment, a metal powder, an ultraviolet ray absorber, a light stabilizer, a fluidity adjusting agent, a leveling agent, a slip agent, a dispersing agent, a color separation inhibitor, an antioxidant, a foam inhibitor, a flame retardant, a thickener, a surface condition regulating agent, a silane coupling agent, and others.

Examples of the pigment are inorganic pigments such as titanium oxide, iron oxide, red iron oxide, calcined pigments, and pearl pigments; organic pigments such as phthalocyanine blue, benzidine yellow, quinacridone, quinacridone red, isoindolinone, and carbon black; loading pigments such as calcium carbonate and barium sulfate; and metallic pigments such as aluminum flakes and stainless flakes. Examples of the metal powder are stainless, aluminum, and bronze powders. Moreover, as a frosting agent, polyethylene wax, polypropylene wax, or a silica-based frosting agent may be added. As the ultraviolet ray absorber, for example, an organic ultraviolet ray absorber typified by a benzophenone-series compound, a benzotriazole-series compound, and an oxalic anilide-series compound, or an inorganic ultraviolet ray absorber typified by a microparticulate titanium oxide and cerium oxide can be used. As the silane coupling agent, in addition to γ-glycidoxypropyltrimethoxysilane, β-(3,4-epoxycyclohexyl)ethyltrimethoxysilane, γ-isocyanatepropyltriethoxysilane, and γ-mercaptopropyltrimethoxysilane, those commonly employed as additives for paint compositions can be used. In the case where the paint composition is dissolved in an organic solvent, to the solvent may be added a dehydrating agent such as orthoformates, orthoacetates, and tetraalkoxysilanes.

The paint composition of the present invention can be applied to such a substrate as a steel plate, stainless, aluminum, concrete, mortar, plastic, and wood with use of a spray, a brush, a roller, or a bar coater.

If the constitutional unit (B) of the copolymer of the present invention is one comprising a monomer unit having an epoxy group, flow immersion, electrostatic coating, or other coating methods are also adoptable. In this case, the paint composition applied is then heated at a temperature of from 130 to 200° C. in an infrared furnace, a dielectric heating furnace or an air heating furnace, or by other heating means, so as to cure to form a hard coating.

The paint composition of the present invention is also available for use in mending old coatings. Specific examples of old coatings that can be mended, i.e., undercoats, include those made of thermosetting or thermomelting paints such as acrylic resin paints, alkyd resin paints, urethane resin paints, epoxy resin paints, acrylic silicone paints, vinyl resin paints, phenol resin paints, polyester resin paints, fluororesin paints, and melamine resin paints; and paints that dry at ordinary temperature such as acrylic resin paints, alkyd resin paints, urethane resin paints, epoxy resin paints, chlorinated rubber paints, fibrin derivative paints, fluororesin paints, oil paints, and vinyl resin paints.

Preferred paint compositions for use in mending coatings are those containing an organic solvent. Of these, paint compositions which contain an organic solvent having a saturated hydrocarbon content of 40% by weight or more, particularly 50% by weight or more, are preferred because such paint compositions are unsusceptible to the lifting phenomenon and thus provide coatings with a good finish.

Also preferred paint compositions for use in mending coatings are, due to their unsusceptible property to the lifting phenomenon, those in which a (meth)acrylic ester unit having an alkyl group of 8 to 20 carbon atoms accounts for 5 to 50% by weight of the total of the constitutional units of the copolymer of the present invention.

In the repair method of an old coating, if the old coating is bulging, has chalked, or has been stained with dirty substances, it would be desired that the paint composition of the present invention is applied after the old coating has been abraded with sand paper or a brush or washed with high pressure water. Application of the paint composition can be conducted using a brush, a spray, a roller, or other tools. The paint composition of the present invention can also be applied to an old coating that has been pre-treated. Alternatively, the paint composition of the present invention may be applied after a paint made from a certain kind of resin selected according to the type of paints of the old coating has been coated on the old coating as a primer and dried. In this case, it is preferred that the primer and the paint composition of the present invention are applied at an interval of from half a day to 1 week. The film thickness of the paint composition of the present invention and that of the primer are preferably from 1 to 100 μm independently.

Hereinafter, the present invention will be described concretely with reference to examples. In the following EXAMPLES, "part(s)" means "part(s) by weight".

EXAMPLES

Synthesis Example 1-1

A 2-liter flask equipped with a stirrer, a thermometer, a dropping funnel, and a nitrogen-introducing tube was charged with 900 grams of butyl acetate as an organic solvent, 220 grams of methyl methacrylate (hereinafter, abbreviated as MMA), 44 grams of butyl methacrylate (hereinafter, abbreviated as BMA), 87 grams of butyl acrylate (hereinafter, abbreviated as BA), 58 grams of hydroxyethyl methacrylate (hereinafter, abbreviated as HEMA), 87 grams of a monomer represented by the following formula (4) (hereinafter, abbreviated as THPI), and 5 grams of methacrylic acid (hereinafter, abbreviated as MAA) as monomers. After the mixture had been subjected to nitrogen substitution sufficiently, the temperature was elevated to 75° C. At the point where the inner temperature of the flask reached 75° C., an initiator solution of 5 grams of azobisisobutylonitrile (hereinafter, abbreviated as AIBN) dissolved in 100 grams of butyl acetate was added dropwise to initiate the polymerization. Thereafter, a monomer mixture in which 220 grams of MMA, 44 grams of BMA, 87 grams of BA, 58 grams of HEMA, 87 grams of THPI, 5 grams of MAA, and 5 grams of AIBN were dissolved was added over 3 hours. Then, the polymerization was conducted for 2 hours at a temperature elevated up to 85° C., and for additional 2 hours at 90° C.

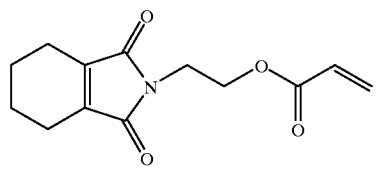

(4)

The polymer solution obtained above was precipiated in a large amount of methanol to give 999 grams of a polymer (yield of polymerization: 99.7%). The hydroxyl value of the polymer obtained was 50 (mgKOH/polymer gram) and the acid value was 6.5 (mgKOH/polymer gram). Analysis by $^1$H-NMR and $^{13}$C-NMR revealed that MMA/BMA/BA/HEMA/THPI/MAA=44/9/17/12/17/1 (% by weight). The glass transition temperature (Tg) of the polymer determined by differential scanning calorimeter (DSC) was 56° C., and the number average molecular weight determined by gel permeation chromatography (GPC) was 18,300.

The polymer was dissolved in a mixture of xylene and butyl acetate having a ratio of 50/50 (weight ratio) so that the solid matter content was 55%, yielding a clear colorless solution.

Synthesis Examples 1-2 to 1-5

The reactions were carried out in the same manner as in Synthesis Example 1-1 with the exception that the monomers were changed as specified below. The results are shown in the following Table 1-1. The following abbreviations St and CHMA mean styrene and cyclohexyl methacrylate, respectively.

Composition of copolymers (% by weight):

Synthesis Example 1-2

MMA/BMA/BA/HEMA/THPI/MAA =48/17.5/17.5/12/4/1

Synthesis Example 1-3

MMA/BMA/BA/HEMA/THPI/MAA =35/9/17/12/26/1

Synthesis Example 1-4

MMA/BMA/HEMA/THPI/St =22/31/12/17.5/17.5

Synthesis Example 1-5

CHMA/BMA/HEMA/THPI =20/39/24/17

TABLE 1-1

| Synthesis Example | Synthesis Example 1-2 | Synthesis Example 1-3 | Synthesis Example 1-4 | Synthesis Example 1-5 |
|---|---|---|---|---|
| Monomers (g) | | | | |
| MMA | 480 | 350 | 220 | |
| CHMA* | | | | 220 |
| BMA | 174 | 88 | 314 | 380 |
| BA | 174 | 174 | | |
| HEMA | 116 | 116 | 116 | 232 |
| THPI | 44 | 261 | 174 | 174 |
| St** | | | 174 | |
| MAA | 10 | 10 | | |
| Yield of polymerization (%) | 99.9 | 99.8 | 99.7 | 99.6 |
| Hydroxyl value | 50 | 50 | 50 | 100 |
| Acid value | 6.5 | 6.5 | <1 | <1 |
| Polymer Tg | 54 | 52 | 64 | 57 |
| Number average molecular weight | 19000 | 18800 | 19700 | 9200 |
| Solubility in xylene/butyl acetate | Soluble | Soluble | Soluble | Soluble |

*CHMA: cyclohexyl methacrylate,
**St: styrene

Comparative Synthesis Examples 1-1 to 1-3

Copolymers were synthesized in the same manner as in Synthesis Example 1-1 with the exception that the following monomers were used (in every case, THPI not contained). The results are shown in Table 1-2.

Composition of copolymers (% by weight):

Comparative Synthesis Example 1-1

MMA/BMA/BA/HEMA/MAA =44/26/17/12/1

Comparative Synthesis Example 1-2

MMA/BMA/HEMA/MAA/St =26/44/12/1/17

Comparative Synthesis Example 1-3

CHMA/BMA/HEMA =25/51/24

TABLE 1-2

| Comparative synthesis Example | Comparative Synthesis Example 1-1 | Comparative Synthesis Example 1-2 | Comparative Synthesis Example 1-3 |
|---|---|---|---|
| Monomers (g) | | | |
| MMA | 438 | 262 | |
| CHMA | | | 250 |
| BMA | 262 | 439 | 502 |
| BA | 174 | | |
| HEMA | 116 | 116 | 232 |
| St | | 174 | |
| MAA | 10 | 10 | |
| Yield of polymerization (%) | 99.5 | 99.2 | 99.1 |
| Hydroxyl value | 50 | 50 | 102 |
| Acid value | 6.5 | 6.5 | <1 |
| Polymer Tg | 47 | 59 | 54 |
| Number average molecular weight | 16700 | 18000 | 7800 |
| Solubility in xylene/butyl acetate | Soluble | Soluble | Soluble |

Example 1-1

67.5 parts of a solution of xylene and MIBK in a weight ratio of 1/1, 45 parts of "Typaque CR-95" (trade name of titanium oxide manufactured by Ishihara Sangyo K. K.) and 150 parts of glass beads were added to and dispersed in 100 parts of the copolymer solution obtained in Synthesis Example 1-1 using a paint conditioner. After removing the glass beads using a filter cloth, to the mixture were added 10 parts of "Coronate HX" (trade name of isocyanate manufactured by Nippon Polyurethane Industry, Co., Ltd.) as a curing agent and 4.0 parts of a 0.1 wt % xylene solution of dibutyl tin dilaurate as a curing accelerator to prepare a paint composition. The curing agent was added so that hydroxyl value/NCO value ratio equals to 1.0. The paint composition thus prepared was applied to a chromate-treated aluminum plate of 0.6 mm thickness so that the coating after dried had a thickness of 40μ, and the coating was dried at ordinary temperature for one week.

The coating thus obtained was examined in the following manner.

1) 60 degree gloss: measured according to a test method described in JIS-K5400.
2) Pencil hardness: measured according to a test method described in JIS-K5400.
3) Cross-cut adhesion: cuts were made so that 100 squares were formed in an area of 1 cm² square, and the number of squares remaining after an adhesive cellophane tape had been peeled away was counted.
4) T-bending test: the test plate was bent by a vise with the same plates interposed therebetween, and the number of plates free from cracks at their bends was counted.
5) Impact resistance (Dupont impact resistance test): using a ½ inch. falling weight of 500 g, tested according to a test method described in JIS-K5400.
6) Weatherability: the coating was continuously irradiated with fluorescent ultraviolet rays by means of QUV (fluorescent ultraviolet ray weatherability testing apparatus available from Q-Panel Company). In each 8-hour cycle, the coated layer was sprayed with ion-exchanged water from the reverse of the coated plate for 4 hours.

The retention rate of 60 degree gloss (%) of the coating after 3,000-hour testing was measured.

The results were: 60 degree gloss: 85, hardness: H/5H (scratched/torn), cross-cut adhesion: 100/100, T-bending test: 3T, Dupont impact resistance: 50 cm, weatherability: 80%

Examples 1-2 to 1-4 and Comparative Examples 1-1 to 1-2

Paint compositions were prepared in the same manner as in Example 1-1 using the copolymers obtained in Synthesis Examples 1-2 to 1-4 and Comparative Synthesis Examples 1-1 to 1-2. Then, using the compositions thus obtained, painted plates were fabricated and tested as in Example 1-1. The results are shown in Table 1-3.

67.5 parts of a solution of xylene and "Sorbesso 100" (trade name, manufactured by Exxon Chemical Co.) having a ratio of 1/1 as a thinner, 45 parts of "Typaque CR-95" (trade name of titanium oxide manufactured by Ishihara Sangyo K. K.) and 150 parts of glass beads were added to and dispersed in 100 parts of each copolymer solution obtained in Synthesis Example 1-5 and Comparative Synthesis Example 1-3 using a paint conditioner. After removing the glass beads with a filter cloth, 23 parts of "Cymel 303" (trade name of methylated melamine manufactured by Mitsui Cytec, Ltd.) as a curing agent was added to the mixture so that Copolymer/Melamine ratio equals to 70/30 (weight ratio). Moreover, as a curing accelerator, 8 parts of 10 wt % xylene solution of p-toluenesulfonic acid was added to the mixture to prepare a paint composition. The paint composition thus obtained was applied to a chromate-treated aluminum plate of 0.6 mm thickness so that the coating after dried had a thickness of 40 μ. After having been allowed to stand still for 30 minutes, the coating was subjected to heat-curing at 180° C. for 30 minutes and then tested in the same manner as in Example 1-1. The results are shown in Table 1-3 shown below.

TABLE 1-3

| | 60 degree gloss | Pencil hardness | Cross-cut adhesion | T-bending test | Dupont impact resistance test (cm) | Weatherability (%) |
|---|---|---|---|---|---|---|
| Example 1-1 | 85 | H/5H | 100/100 | 3T | 50 | 80 |
| Example 1-2 | 88 | H/5H | 100/100 | 2T | 30 | 71 |
| Example 1-3 | 80 | 2H/5H | 100/100 | 3T | 50 | 83 |
| Example 1-4 | 92 | H/4H | 100/100 | 2T | 30 | 78 |
| Example 1-5 | 85 | 2H/5H | 100/100 | 5T | 10 | 85 |
| Comparative Example 1-1 | 72 | H/4H | 90/100 | 3T | 10 | 42 |
| Comparative Example 1-2 | 83 | H/3H | 100/100 | 4T | 5 | 38 |
| Comparative Example 1-3 | 72 | 2H/3H | 100/100 | >5T | 5 | 56 |

Synthesis Example 1-6

A 2-liter flask equipped with a stirrer, a thermometer, a dropping funnel, and a nitrogen-introducing tube was charged with 400 grams of butyl acetate as a solvent. The solvent was stirred under nitrogen blanket and then the temperature was raised to 85° C. Upon completion of the elevation of temperature, a mixture of 20 grams of MMA, 164 grams of cyclohexyl acrylate (hereinafter, abbreviated as CHA), 40 grams of lauryl methacrylate (hereinafter, abbreviated as LMA), 40 grams of stearyl methacrylate (hereinafter, abbreviated as SMA), 40 grams of isoboronyl methacrylate (hereinafter, abbreviated as IBX), 56 grams of HEMA, 40 grams of THPI, and 6.0 grams of AIBN was added dropwise over 3 hours. Thereafter, to the mixture was added a solution composed of 0.6 gram of AIBN and 10 grams of butyl acetate. The mixture was stirred at 90° C. for 2 hours and then cooled to give a polymer solution.

The polymer solution thus obtained was precipitated in a large amount of methanol to give 396 grams of a copolymer (yield of polymerization: 99%). The hydroxyl value of the copolymer obtained was 60 (mgKOH/polymer g), and the acid value was zero (mgKOH/polymer g). Analysis by $^1$H-NMR and $^{13}$C-NMR revealed that MMA/CHA/LMA/SMA/IBX/THPI/HEMA=5/41/10/10/10/10/14 (% by weight). The glass transition temperature (Tg) of the polymer determined by DSC was 27° C., and the number average molecular weight determined by GPC was 17,300.

The polymer was dissolved in HAWS (trade name of aliphatic hydrocarbon-series solvent having an aromatic matter content of about 50%, manufactured by Shell Chemical Company) so that the solid matter content was 50%, yielding a clear colorless solution (hereinafter, also referred to as A-1).

Synthesis Examples 1-7 to 1-9

Except that the monomers used in Synthesis Example 1-6 were changed as specified in Table 1-4, the same procedure as in Synthesis Example 1-6 was conducted to give the copolymer solutions shown in Table 1-4. Hereinafter, these copolymer solutions corresponding to Synthesis Examples 1-7 to 1-9 were also referred to as A-2, A-3, A-4, respectively.

TABLE 1-4

| Synthesis Example | Synthesis Example 1-7 | Synthesis Example 1-8 | Synthesis Example 1-9 |
|---|---|---|---|
| Monomers (g) | | | |
| BMA | 40 | 147 | 30 |
| CHA | 80 | | 160 |
| EHMA* | | 20 | 16 |
| SMA | 76 | 80 | 60 |
| CHMA** | 76 | | 40 |
| IBX | 24 | 60 | |
| THPI | 48 | 34 | 30 |
| HEMA | 56 | 56 | 64 |
| MAA*** | | 3 | |
| Total | 400 | 400 | 400 |
| Yield of polymerization (%) | 98 | 99 | 98 |
| Hydroxyl value | 60 | 60 | 69 |
| Acid value | 0 | 4.9 | 0 |
| Polymer Tg | 43 | 40 | 29 |
| Number average molecular weight | 15700 | 17200 | 14700 |
| Solubility in HAWS | Soluble | Soluble | Soluble |

*2-ethylhexyl methacrylate,
**cyclohexyl methacrylate,
***methacrylic acid

Composition of copolymer (% by weight):

Synthesis Example 1-7

BMA/CHA/SMA/CHMA/IBX/HEMA/THPI =10/20/19/19/6/14/12

Synthesis Example 1-8

BMA/EHMA/SMA/IBX/HEMA/THPI/MAA =36.8/5/20/15/14/8.5/0.7

Synthesis Example 1-9

BMA/CHA/EHMA/SMA/CHMA/HEMA/THPI =7.5/40/4/15/20/7.5/16

Synthesis Example 1-10

Except that the monomers used in Synthesis Example 1-6 were changed as specified in Table 1-5, the same procedure as in Synthesis Example 1-6 was conducted to give the copolymer solution shown in Table 1-5. In Synthesis Example 1-10, probably due to its insufficient solubility in HAWS, the copolymer became turbid whitely. Therefore, evaluation of the copolymer as the paint composition, which will later be described, was done using not a HAWS solution but a butyl acetate solution (hereinafter, also referred to as A-5).

TABLE 1-5

| Synthesis Example | Synthesis Example 1-10 |
|---|---|
| Monomers (g) | |
| BMA | 30 |
| CHA | 172 |
| EHMA | |
| SMA | 12 |
| CHMA | 100 |
| IBX | |
| HEMA | 56 |
| THPI | 30 |
| MAA | |
| Total | 400 |
| Yield of polymerization (%) | 99.8 |
| Hydroxyl value | 60 |
| Acid value | 0 |
| Polymer Tg | 42 |
| Number average molecular weight | 13700 |
| Solubility in HAWS | Whitely turbid |

Composition of copolymer (% by weight):

Synthesis Example 1-10

BMA/CHA/SMA/HEMA/THPI =7.5/68.0/3.0/14.0/7.5

Comparative Synthesis Examples 1-4 to 1-5

Copolymers were synthesized, precipitated in methanol, and dissolved in HAWS in the same manner as in Synthesis Example 1-6. The amounts of the monomers used and the results of analysis of the copolymers obtained are shown in Table 1-6. Hereinafter, the HAWS solutions of the copolymers corresponding to Comparative Synthesis Examples 1-4 and 1-5 are referred to also as A-6 and A-7, respectively.

TABLE 1-6

| Comparative Synthesis Example | Comparative Synthesis Example 1-4 | Comparative Synthesis Example 1-5 |
|---|---|---|
| Monomers (g) | | |
| BMA | 40 | 142 |
| CHA | 80 | |
| EHMA | | 20 |
| SMA | 76 | 80 |
| CHMA | 76 | |

TABLE 1-6-continued

| Comparative Synthesis Example | Comparative Synthesis Example 1-4 | Comparative Synthesis Example 1-5 |
|---|---|---|
| IBX | 24 | 60 |
| HEMA | 48 | 53 |
| THPI | | |
| MAA | | 2 |
| Total | 344 | 357 |
| Yield of polymerization (%) | 97.6 | 98.4 |
| Hydroxyl value | 60 | 64 |
| Acid value | 0 | 3.5 |
| Polymer Tg | 40 | 39 |
| Number average molecular weight | 18000 | 11500 |
| Solubility in HAWS | Soluble | Soluble |

Composition of copolymer (% by weight):

Comparative Synthesis Example 1-4

BMA/CHA/SMA/CHMA/IBX/HEMA =11.5/23.3/22.1/22.1/7.0/14.0

Comparative Synthesis Example 1-5

BMA/EHMA/SMA/IBX/HEMA/MAA =39.8/5.7/22.4/16.8/14.8/0.5

Synthesis Example of Hydrolyzed Condensate of Alkoxysilane

According to the composition recipe shown below, tetraethoxysilane was hydrolyzed in the presence of polyethylene glycol. A 1-liter three-necked flask was charged with the following starting materials, and the temperature was elevated to 60° C. under nitrogen blanket.

| | |
|---|---|
| PEG 400 (manufactured by NOF Corp.) | 25 grams |
| tetraethoxysilane | 260 grams |
| propyleneglycol monomethyl ether | 150 grams |
| isopropanol | 150 grams |
| p-toluenesulfonic acid | 0.6 gram |

Secondly, a mixture of 22.5 grams of ion-exchanged water and 30 grams of isopropanol was added thereto dropwise over 30 minutes, and the mixture was stirred at 70° C. for 1 hour. After having been neutralized with a basic ion-exchanged resin, from the mixture was removed the solvent using an evaporator to give a hydrolyzed condensate (hereinafter, referred to also as S-1).

Preparation of Paint

According to the composition recipe shown in Table 1-7, a HAWS solution of the copolymer synthesized in Synthesis Examples 1-6 to 1-9 (A-1 to A-4), and "Typaque CR-95" (trade name of titanium oxide manufactured by Ishihara Sangyo K. K.), and 130 grams of glass beads were mixed and dispersed using a paint conditioner until pigment particles had a size of 10μ or smaller. To the dispersion was added "Takenate D-177N" (trade name of polyisocyanate curing agent, manufactured by Takeda Chemical Industries, Ltd.) or "Duranate TSA100" (trade name of polyisocyanate curing agent, manufactured by Asahi Chemical Industry, Co., Ltd.) so that NCO/OH ratio equals to 1.0/1.0 (molar ratio), and dibutyl tin dilaurate as a curing catalyst and other additives were added thereto. Then, the glass beads were removed with a filter cloth. The resulting mixture was diluted with "Naphtha No.6" (trade name of hydrocarbon-series mixed solvent having an aromatic matter content of 28%, manufactured by Exxon Chemical Co.) so as to have a viscosity by Iwata Cup of 30 seconds to prepare a paint composition.

TABLE 1-7

| | Example 1-6 | Example 1-7 | Example 1-8 | Example 1-9 | Example 1-10 |
|---|---|---|---|---|---|
| Formulated Ingredients | | | | | |
| A-1 (g) | 100 | 100 | | | |
| A-2 (g) | | | 100 | | |
| A-3 (g) | | | | 100 | |
| A-4 (g) | | | | | 100 |
| CR-95 (g) | 33.3 | 33.3 | 33.3 | 33.3 | 33.3 |
| Takenate D-177N (g) | 11.2 | 11.2 | 11.2 | 11.2 | |
| Duranate TSA-100 (g) | | | | 10.9 | 12.6 |
| S-1 (g) | | 6.0 | | | 6.0 |
| Naphtha No. 6 (g) | 25.2 | 22.2 | 18.2 | 28.5 | 15.8 |
| DPTDL solution (g) 1) | 0.3 | 0.3 | 0.3 | 0.3 | 0.3 |
| Total weight (g) | 170.0 | 173.0 | 163.0 | 173.0 | 168.0 |
| Aliphatic hydrocarbon content in solvent (wt %) | 57 | 57 | 56 | 58 | 55 |

1) 1% xylene solution of dibutyl tin dilaurate

According to the composition recipe shown in Table 1-8, the butyl acetate solution of the copolymer synthesized in Synthesis Example 1-10 (A-5) was made into a dispersion in the same manner as described above. The dispersion was then mixed with a curing agent, a curing catalyst, and other additives, and diluted with xylene to such an extent as to have a viscosity by Iwata Cup of 30 seconds.

TABLE 1-8

| | Example 1-11 | Example 1-12 |
|---|---|---|
| Formulated Ingredients | | |
| A-5 (g) | 100 | 100 |
| CR-95 (g) | 33.3 | 33.3 |
| Takenate D-177N (g) | 11.2 | 11.2 |
| S-1 (g) | | 6.0 |
| Naphtha No. 6 (g) | 19.2 | 20.2 |
| DBTDL solution (g) | 0.3 | 0.3 |
| Total weight (g) | 164.0 | 171.0 |
| Aliphatic hydrocarbon content in solvent (wt %) | 20 | 21 |

Using the copolymer solutions obtained in Comparative Synthesis Examples 1-4 and 1-5 (A-6 to A-7), paint compositions for comparison were prepared in the same manner as was described above. The composition recipe is shown in Table 1-9.

TABLE 1-9

|  | Comparative Example 1-4 | Comparative Example 1-5 |
|---|---|---|
| Formulated Ingredients |  |  |
| A-6 (g) | 100 |  |
| A-7 (g) |  | 100 |
| CR-95 (g) | 33.3 | 33.3 |
| Duranate TSA-100 (g) | 10.9 | 11.6 |
| S-1 (g) |  | 6.0 |
| Naphtha No. 6 (g) | 30.5 | 13.8 |
| DBTDL solution (g) | 0.3 | 0.3 |
| Total weight (g) | 175.0 | 165.0 |

TABLE 1-9-continued

|  | Comparative Example 1-4 | Comparative Example 1-5 |
|---|---|---|
| Aliphatic hydrocarbon content in solvent (wt %) | 58 | 54 |

Evaluation of Coating Properties

Each of the paints prepared in Examples 1-6 to 1-12 and Comparative Examples 1-4 to 1-5 was applied using a bar coater to an aluminum plate 5052P that has been treated by an alodine process with alodine 1000, so that the resulting coating after dried had a thickness of 30 μm, and the coating was dried for 1 week under conditions of 23° C. and 50% RH. The coating thus obtained was examined in the following manner. The results are shown in Table 1-10.

1) 60 degree gloss: the 60 degree gloss of each coating was measured according to JIS-K5400.
2) Pencil hardness: Pencil scratching tests were conducted according to JIS-K5400 to determine the maximum hardness to which extent the coatings could remain unscratched.
3) Solvent resistance: using a rubbing tester, each coating was reciprocatingly rubbed with xylene 100 times under a load of 1 kg. The surface of each coating was visually examined.
   ○: nothing occurred
   X: damaged
4) Impact resistance (Dupont impact resistance test): using a ½ inch. falling weight of 500 g, measured according to a test method described in JIS-K5400.
5) Accelerated weatherability: using a sunshine carbon ark light (JIS K5400), the 60 degree gloss of each coating before and after the 2,000-hour testing was measured, and the retention rate was figured out.
6) Stain resistance Each test plate was exposed outdoor at an angle of 45 degrees in an industrial district located in the south of Nagoya city, JAPAN for 3 months. The brightness values (L) of each coating in the initial stage of and after the testing were measured, and the difference (ΔL) was figured out. The smaller the absolute value of ΔL is, the less stained the test plate has been.

TABLE 1-10

|  | 60 degree gloss | Pencil hardness | Solvent resistance | Dupont impact resistance | Accelerated weatherability | Stain resistance |
|---|---|---|---|---|---|---|
| Example 1-6 | 90 | 2B | ○ | 50 | 90 | −8.5 |
| Example 1-7 | 87 | B | ○ | 50 | 88 | −2.2 |
| Example 1-8 | 92 | 2B | ○ | 50 | 92 | −7.8 |
| Example 1-9 | 91 | 3B | ○ | 50 | 88 | −10.0 |
| Example 1-10 | 90 | B | ○ | 50 | 87 | −1.8 |
| Example 1-11 | 88 | HB | ○ | 50 | 88 | −9.0 |
| Example 1-12 | 86 | F | ○ | 50 | 82 | −2.3 |
| Comparative Example 1-4 | 79 | 3B | ○ | 50 | 59 | −10.2 |
| Comparative Example 1-5 | 80 | 2B | ○ | 50 | 43 | −2.0 |

Evaluation of Lifting

Each of the paints prepared in Examples 1-6 to 1-12 was coated onto the following two types of undercoats (A, B) with a brush. The condition of each coating was observed. The results are shown in Table 1-11 in accordance with the following criteria.

○: nothing occurred

Δ: suffered the lifting phenomenon to some extent

X: suffered the lifting phenomenon considerably

A: an undercoat formed in the following manner: a commercial epoxy-based paint was applied to a bonderized steel plate by spraying. After one day, a commercial long-oil alkyd paint was applied thereon in a thickness of 30 μm with a brush. The coating was dried at room temperature for 1 week and then treated by a sunshine carbon ark light (JIS K5400) for 1,000 hours.

B: an undercoat formed in the following manner: a commercial epoxy-based paint was applied to a degreased cold rolled steel plate (SPCC) by spraying. After one day, a commercial acrylic lacquer was applied thereon in a thickness of 30 μm with a brush. The coating was dried at room temperatures for one week and treated by a sunshine carbon ark light (JIS K5400) for 1,000 hours.

TABLE 1-11

|  | A | B |
| --- | --- | --- |
| Example 1-6 | ○ | ○ |
| Example 1-7 | ○ | ○ |
| Example 1-8 | ○ | ○ |
| Example 1-9 | ○ | ○ |
| Example 1-10 | ○ | ○ |
| Example 1-11 | X | X |
| Example 1-12 | X | X |

The coatings obtained from all the paint compositions of Examples had exceptional weatherability. This is probably because the copolymer in each paint composition has a THPI unit. On the other hand, all the paint compositions of Comparative Examples are composed of a copolymer having no THPI unit, and therefore, the weatherability of the coatings made therefrom was poor.

The coatings obtained from the paint compositions of Examples 1-1 to 1-5 were hard. This may be explained by the fact that, in the copolymer being a component of the paint composition, the (meth)acrylic ester monomer unit having a straight-chain, branched-chain, or cyclic alkyl group is one having an alkyl group containing 1 to 7 carbon atoms.

The paint compositions of Examples 1-6 to 1-10, when applied over the undercoats, did not suffer the lifting phenomenon. This is probably because, in the copolymer being a component of the paint composition, a (meth)acrylic ester monomer unit having an alkyl group containing 8 to 20 carbon atoms accounts for 5 to 50% by weight of the total amount of the constitutional monomer units and the organic solvent in the paint composition is one that contains 40% by weight or more of a saturated hydrocarbon.

The coatings obtained from the paint compositions of Examples 1-7 to 1-10, and 1-12 were particularly excellent in stain resistance. This may be explained by the fact that the compositions are those admixed with a hydrolyzed condensate of an alkoxysilane.

Synthesis Example 2-1

A 2-liter flask equipped with a stirrer, a thermometer, a dropping funnel, and a nitrogen-introducing tube was charged with 900 grams of butyl acetate as an organic solvent, 400 grams of MMA, 280 grams of BMA, 150 grams of glycidyl methacrylate (hereinafter, abbreviated as GMA), and 174 grams of THPI as monomers. After the mixture had been subjected to nitrogen substitution sufficiently, the temperature was elevated to 75° C. At the point where the inner temperature of the flask reached 75° C., an initiator solution of 10 grams of AIBN dissolved in 100 grams of butyl acetate was added dropwise to initiate the polymerization. Thereafter, the polymerization was conducted for 2 hours at a temperature elevated to 85° C., and for additional 2 hours at 90° C.

The polymer solution thus obtained was precipitated in a large amount of methanol to give 1,000 grams of a copolymer (yield of polymerization: 99.6%). The epoxy value of the copolymer obtained was 0.105. Analysis by $^1$H-NMR and $^{13}$C-NMR revealed that MMA/BMA/GMA/THPI=40/28/15/17 (% by weight). The glass transition temperature (Tg) of the copolymer determined by DSC was 69° C., and the number average molecular weight determined by GPC was 20,300. The thermal decomposition initiation temperature determined (in a nitrogen atmosphere) by a thermogravimetry differential thermal analyzer (TG-DTA) was 275° C. The copolymer was dissolved in a mixture of xylene and butyl acetate having a ratio of 50/50 (weight ratio) so that the solid matter content was 50%, yielding a clear colorless solution.

Synthesis Example 2-2

Using the monomers specified in the following Table 2-1, the same reaction was effected as in Synthesis Example 2-1 to give a copolymer. The composition of the copolymer (% by weight) is MMA/BMA/GMA/THPI=26.3/26.3/30/17.4.

Reference Example (Synthesis of Curing Agent)

An acid group-containing copolymer shown in Table 2-1 was synthesized in the same manner as in Synthesis Example 2-1 with the exception that MAA was used instead of GMA, and used as a curing agent. The composition of the copolymer (% by weight) is MMA/BMA/THPI/MAA=40/35.5/17.5/7.

Comparative Synthesis Example 2-1 and
Comparative Reference Example 2-1

Copolymers were obtained in the same manner as in Synthesis Example 2-1 with the exception that the monomers specified in Table 2-1 were used. The copolymer obtained in Comparative Reference Example 2-1 was used as a curing agent in the following Comparative Example 2-1. The composition of each copolymer is as follows.

Comparative Synthesis Example 2-1

MMA/BMA/GMA=50/35/15 (% by weight)

Comparative Reference Example 2-1

MMA/BMA/MAA=50/43/7 (% by weight)

TABLE 2-1

|  |  | Synthesis Example 2-2 | Reference Example | Comparative Synthesis Example 2-1 | Comparative Reference Example 2-1 |
| --- | --- | --- | --- | --- | --- |
| Monomers (g) | MMA | 263 | 400 | 500 | 500 |
|  | BMA | 263 | 355 | 350 | 430 |
|  | GMA | 300 |  | 150 |  |
|  | THPI | 174 | 175 |  |  |
|  | MAA |  | 70 |  | 70 |
| Yield of polymerization (%) |  | 99.7 | 99.9 | 99.5 | 99.1 |
| Epoxy value |  | 0.211 |  | 0.106 |  |
| Acid value |  |  | 46 |  | 46 |
| Polymer Tg |  | 71 | 63 | 70 | 62 |
| Number average molecular weight |  | 18600 | 20800 | 18000 | 19100 |
| Thermal decomposition initiation temperature |  | 272 | 268 | 224 | 222 |
| Solubility in xylene/butyl acetate |  | Soluble | Soluble | Soluble | Soluble |
|  |  |  | (Curing agent) |  | (Curing agent) |

Example 2-1

40 parts of a solution, as an organic solvent, of xylene and "Sorbesso 100" (trade name, manufactured by Exxon Chemical Co.) in a weight ratio of 1/1, 41 parts of "Typaque CR-95" (trade name of titanium oxide manufactured by Ishihara Sangyo K. K.) and 100 parts of glass beads were added to and dispersed in 100 parts of the copolymer solution obtained in Synthesis Example 2-1 (concentration: 50%) using a paint conditioner. Then, the glass beads were removed with a filter cloth to prepare a main agent.

On the other hand, 40 parts of a solution, as an organic solvent, of xylene and "Sorbesso 100" in a weight ratio of 1/1, 41 parts of "Typaque CR-95" (trade name of titanium oxide manufactured by Ishihara Sangyo K. K.) and 100 parts of glass beads were added to and dispersed in 100 parts of the acid group-containing copolymer solution obtained in Reference Example using a paint conditioner. Then, the glass beads were removed with a filter cloth to prepare a curing agent.

After 100 parts of the main agent and 125 parts of the curing agent were mixed together, 0.3 part of p-toluenesulfonic acid hydrate as a curing accelerator was added thereto to give a paint composition. The paint composition was applied to a chromate-treated aluminum plate of 0.6 mm thickness so that the resulting coating after dried had a thickness of 40μ. After having been allowed to stand still for 30 minutes, the coating was subjected to heat-curing at 190° C. for 20 minutes.

The coating thus obtained was examined in the following manner.

1) 60 degree gloss: measured according to a test method described in JIS-K5400.
2) Yellowing properties: b-value measured by a differential colorimeter smaller than 0.5 was considered to indicate good anti-yellowing properties, and b-value of 0.5 or larger was considered to indicate poor anti-yellowing properties.
3) Pencil hardness: measured according to a test method described in JIS-K5400.
4) Cross-cut adhesion: cuts were made so that 100 squares were formed in an area of 1 cm² square, and the number of squares remaining after an adhesive cellophane tape had been peeled away was counted.
5) Marker stain resistance: a line were drawn on the coating with a black permanent marker and dried for 24 hours. Then, the line was wiped out with tissue impregnated with ethanol. The surface of the coating was examined and evaluated according to the following criteria.
   ○: no trace
   Δ: stain remained slightly visible
   X: stain remained clearly visible
6) Acid rain resistance: 70% sulfuric acid was dropped on the surface of the coating with a dropping pipette, and the coating was kept as it was at 60° C. for 2 hours. After washed with water, the surface of the coating was visually examined and evaluated according to the following criteria.
   ○: no trace
   Δ: stain remained slightly visible
   X: stain remained clearly visible
7) Weatherability The coating was continuously irradiated with fluorescent ultraviolet rays by means of QUV (fluorescent ultraviolet ray weatherability testing apparatus available from Q-Panel Company). In each 8-hour cycle, the coated layer was sprayed with ion-exchanged water from the reverse of the coated plate for 4 hours. The retention rate of 60 degree gloss (%) of the coating after 2,500-hour testing was measured. The results are shown in Table 2-2.

Example 2-2

80 parts of the copolymer obtained in Synthesis Example 2-2 was dried sufficiently and mixed with 60 parts of titanium oxide "R902" (trade name, manufactured by Ishihara Sangyo K. K.), 5 parts of an adhesion improving agent "YD012" (trade name, manufactured by Tohto Kasei Co., Ltd.), 1.5 parts of a leveling agent "Acronal 14F" (trade name, manufactured by BASF), 0.5 part of a foam inhibitor benzoin, and 19.4 parts of a curing agent dodecanedioic acid at room temperature for 1 minute by a Henschell mixer. Then, the mixture was melt-kneaded at 90 to 110° C. by an extrusion kneader. After cooling, the mixture was finely milled by an impact mill and coarse particles were removed therefrom with a sieve of 150 mesh to give a powder paint. The powder paint thus obtained was applied to a zinc phosphate-treated iron plate of 0.8 mm thickness by electrostatic coating and heated at 180° C. for 30 minutes to give a hard coating having, after dried, a thickness of 40 μm. Smoothness of the surface of the coating thus obtained was good. The results of the tests are shown in Table 2-2.

TABLE 2-2

|  | 60 degree gloss | Yellowing properties | Pencil hardness | Cross-cut adhesion | Marker stain resistance | Acid rain resistance | Weatherability (%) |
| --- | --- | --- | --- | --- | --- | --- | --- |
| Example 2-1 | 89 | Good | 2H/5H | 100/100 | ○ | ○ | 88 |
| Example 2-2 | 80 | Good | 2H/5H | 100/100 | ○ | ○ | 78 |
| Comparative Example 2-1 | 62 | Poor | 2H/4H | 100/100 | Δ | ○ | 28 |

Comparative Example 2-1

A cured coating was formed in the same manner as in Example 2-1 with the exception that the copolymer of Comparative Synthesis Example 2-1 and the copolymer of Comparative Reference Example 2-1 (as a curing agent) were used. The coating was tested in the same manner as in Example 2-1. The results are shown in Table 2-2 shown above.

Synthesis Example 3-1

A 1-liter flask equipped with a stirrer, a thermometer, a dropping funnel, and a nitrogen-introducing tube was charged with 400 grams of butyl acetate as an organic solvent, 50 grams of trimethyl orthoformate (hereinafter, abbreviated as OFM), 175 grams of MMA, 44 grams of BMA, 87 grams of BA, 58 grams of γ-trimethoxysilylpropyl methacrylate (hereinafter, abbreviated as MTRIMS), and 87 grams of THPI. After the mixture had been subjected to nitrogen substitution sufficiently, the temperature was elevated to 75° C. At the point where the inner temperature of the flask reached 75° C., an initiator solution of 5 grams of AIBN dissolved in 50 grams of butyl acetate was added dropwise to initiate the polymerization. After having been kept at 75° C. for 3 hours, the polymerization was performed for 2 hours at a temperature elevated up to 85° C., and for additional 2 hours at 90° C.

The polymer solution thus obtained was precipitated in a large amount of methanol to give 446 grams of a copolymer (yield of polymerization: 98.9%). Analysis of the copolymer by $^1$H-NMR and $^{13}$C-NMR revealed that MMA/BMA/BA/MTRIMS/THPI=39/10/19/13/19 (% by weight). The glass transition temperature (Tg) of the copolymer determined by DSC was 47° C., and the number average molecular weight determined by GPC was 17,300.

The copolymer was dissolved in a mixture of xylene and butyl acetate having a ratio of 50/50 (weight ratio) so that the solid matter content was 55%, yielding a clear colorless solution.

Synthesis Examples 3-2 to 3-3 and Comparative Synthesis Example 3-1

Except that the monomers specified in Table 3-1 were used, the reactions were carried out in the same manner as in Synthesis Example 3-1 to give copolymers shown in Table 3-1. The composition of each copolymer is shown below (% by weight).

Synthesis Example 3-2

CHMA/BMA/IBMA/THPI/MTRIMS=37/18/27/8/10

Synthesis Example 3-3

MMA/BMA/BA/THPI/St/MTRIES=22/30/2/17.5/17.5/11

Comparative Synthesis Example 3-1

=MMA/BMA/BA/MTRIMS=45/26/17/12

TABLE 3-1

|  |  | Synthesis Example 3-2 | Synthesis Example 3-3 | Comparative Synthesis Example 3-1 |
|---|---|---|---|---|
| Monomers (g) | MMA |  | 110 | 225 |
|  | CHMA | 183 |  |  |
|  | BMA | 92 | 150 | 130 |
|  | IBMA | 133 |  |  |
|  | BA |  | 10 | 87 |
|  | THPI | 42 | 87 |  |
|  | St |  | 87 |  |
|  | MTRIMS | 50 |  | 58 |
|  | MTRIES |  | 56 |  |
| Yield of polymerization (%) |  | 99.1 | 99.5 | 99.5 |
| Polymer Tg |  | 31 | 51 | 45 |
| Number average molecular weight |  | 28000 | 15600 | 22300 |
| Solubility in xylene/butyl acetate |  | Soluble | Soluble | Soluble |

Description of the abbreviations used in Table 3-1 shown above.

CHMA: cyclohexyl methacrylate, IBMA: isobutyl methacrylate, St: styrene, MTRIES: ã-triethoxysilylpropyl methacrylate Example 3-1

67.5 parts of a solution, as a thinner, of xylene and MIBK in a weight ratio of 1/1, 45 parts of "Typaque CR-95" (trade name of titanium oxide manufactured by Ishihara Sangyo K. K.) and 150 parts of glass beads were added to and dispersed in 100 parts of the copolymer solution obtained in Synthesis Example 3-1 using a paint conditioner. After removing the glass beads with a filter cloth, 11 parts of an 1 wt % xylene solution of dibutyl tin dilaurate as a curing accelerator was added to prepare a paint composition. The paint composition thus obtained was applied to a chromate-treated aluminum plate of 0.6 mm thickness so that the resulting coating after dried had a thickness of 30μ, and the coating was then dried at room temperature for one week.

The coating thus obtained was examined in the following manner.

1) 60 degree gloss: measured according to a test method described in JIS-K5400.
2) Pencil hardness: measured according a test method described in JIS-K5400.
3) Cross-cut adhesion: cuts were made so that 100 squares were formed in an area of 1 cm² square, and the number of squares remaining after an adhesive cellophane tape had been peeled away was counted.
4) T-bending test: the test plate was bent by a vise with the same plates interposed therebetween, and the number of plates free from cracks at their bends was counted.
5) Dupont impact resistance test: using a ½ inch. falling weight of 500 g, tested according to a test method described in JIS-K5400.
6) Weatherability: a cycle of irradiation using a SUV (Eye Super accelerated weatherability testing apparatus produced by Iwasaki Electric Co. Ltd.) for 6 hours followed by condensation for 2 hours was repeated for 1,000 hours. The 60 degree gloss retention rate (%) after the test was measured.

The results of the tests are shown in Table 3-2 below.

Examples 3-2 to 3-3 and Comparative Example 3-1

In the same manner as in Example 3-1, paint compositions were prepared from the copolymers obtained in Synthesis Examples 3-2 to 3-3 and Comparative Synthesis Example 3-1. Coated plates were fabricated and tested as in Example3-1. The results are shown in Table 3-2.

TABLE 3-2

|  | 60 degree gloss | Pencil hardness | Cross-cut adhesion | T-bending test | Dupont impact resistance test (cm) | Weatherability (%) |
|---|---|---|---|---|---|---|
| Example 3-1 | 82 | H/4H | 100/100 | 5T | 20 | 82 |
| Example 3-2 | 79 | H/5H | 100/100 | 5T | 10 | 98 |
| Example 3-3 | 91 | F/4H | 100/100 | 4T | 10 | 76 |
| Comparative Example 3-1 | 68 | F/2H | 35/100 | >5T | 5 | 38 |

According to the present invention, highly glossy coatings that exhibit excellent weatherability can be obtained with ease. Moreover, coatings that show exceptional adhesion to substrates and thermosetting paints free from yellowing can also be prepared, and therefore, the present invention is widely applicable for use in a variety of paints.

What is claimed is:

1. A paint composition which comprises a copolymer comprising:

(A) an acrylic or methacrylic ester monomer unit having a straight-chain, branched-chain, or cyclic alkyl group;
   (B) at least one monomer unit selected from the group consisting of a monomer unit having an unsaturated double bond and a hydroxyalkyl group, a monomer unit having an unsaturated double bond and an epoxy group, and a monomer unit having an unsaturated double bond and an alkoxysilyl group; and
   (C) a monomer unit having an unsaturated double bond and a maleimide group, as constitutional units.

2. The paint composition according to claim 1, wherein the maleimide group is represented by the following formula (1):

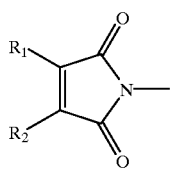

(1)

wherein $R_1$ and $R_2$ are independently a hydrogen atom or an alkyl group having 4 or less carbon atoms; one of $R_1$ and $R_2$ is a hydrogen atom and the other is an alkyl group having 4 or less carbon atoms; or $R_1$ and $R_2$ are a hydrocarbon group of a 5- or 6-membered ring formed by linkage with each other.

3. The paint composition according to claim 1, wherein the monomer as the constitutional unit (C) is a monomer represented by the following general formula (2):

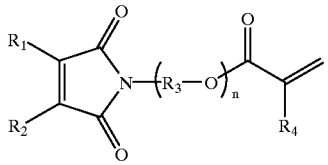

(2)

wherein $R_1$ and $R_2$ are independently a hydrogen atom or an alkyl group having 4 or less carbon atoms; one of $R_1$ and $R_2$ is a hydrogen atom and the other is an alkyl group having 4 or less carbon atoms; or $R_1$ and $R_2$ are a hydrocarbon group of a 5- or 6-membered ring formed by linkage with each other; $R_3$ is an alkylene group which may be branched; $R_4$ is a hydrogen atom or a methyl group; and n is an integer of 1 to 6.

4. The paint composition according to claim 1, wherein the constitutional unit (B) comprises a monomer unit having an unsaturated double bond and a hydroxyalkyl group.

5. The paint composition according to claim 4, which further comprises a curing agent reactive with hydroxyl groups.

6. The paint composition according to claim 4, which further comprises a hydrolyzed condensate of an alkoxysilane.

7. The paint composition according to claim 1, wherein the constitutional unit (B) comprises a monomer unit having an unsaturated double bond and an epoxy group, said composition being thermosetting.

8. The paint composition according to claim 1, in which said copolymer is contained in an organic solvent.

9. The paint composition according to claim 8, wherein the organic solvent is one selected from the group consisting of cyclic ethers, aromatic hydrocarbons, esters, and ketones.

10. The paint composition according to claim 8, wherein the organic solvent comprises 40% or more of a saturated hydrocarbon.

11. The paint composition according to claim 10, wherein an acrylic or methacrylic ester monomer having an alkyl group containing 8 to 20 carbon atoms accounts for 5 to 50% by weight of the total amount of the constitutional units of the copolymer.

12. A process for repairing a coating using the paint composition recited in claim 10 or 11.

* * * * *